Feb. 23, 1960

W. SPIELVOGEL 2,926,002

COOKING UTENSIL FOR FOAMING LIQUIDS

Filed July 11, 1957

INVENTOR:
WALTER SPIELVOGEL
BY
Karl F. Ross
AGENT

Feb. 23, 1960

W. SPIELVOGEL 2,926,002

COOKING UTENSIL FOR FOAMING LIQUIDS

Filed July 11, 1957

INVENTOR:
WALTER SPIELVOGEL
BY
Karl F. Ross
AGENT

2,926,002
COOKING UTENSIL FOR FOAMING LIQUIDS

Walter Spielvogel, Essen-Frillendorf, Germany, assignor to Anneliese Hasenberg, Essen, Germany Application July 11, 1957, Serial No. 672,103

Claims priority, application Germany July 14, 1956

2 Claims. (Cl. 257—106)

The present invention relates to cooking utensils, more particularly to vessels for the cooking of liquids which tend to foam and/or to produce undesirable sedimentation, as in the thickening of wort and mash in breweries.

In my co-pending application Ser. No. 579,504, filed April 20, 1956, now abandoned I have already disclosed a cooking vessel for the purpose set forth in which means are provided to counteract any foaming tendency by creating a strong circulation causing the liquid to gush upwardly at the center of the vessel, this circulation being brought about by a frustoconical heater surrounding a central boss with clearance to form a channel for the upward flow of the liquid. My present invention has for its general object the provision of means for still more vigorously agitating the liquid in a cooking vessel of the character referred to.

A more specific object of my present invention is to provide means for staggering the supply of heat in a vessel of the type referred to so as to enable an effective preliminary heating of the liquid when the vessel is only partly filled, without any objectionable loss of heat to the atmosphere, while permitting the full heating energy to be turned on after the liquid in the vessel has reached a certain level.

I have found, in accordance with a feature of the present invention, that the desired enhancement of circulation to counteract foaming and/or sedimentation can be most readily accomplished by so shaping the heater and/or the vessel proper that the central channel defined thereby decreases in cross-section toward the top, thus resulting in a progressive acceleration of the column of liquid gushing upwardly within that channel.

In accordance with another feature of this invention, I provide a heater comprising a plurality of generally frustoconical sections, successive sections rising to a higher level above the bottom of the vessel. These sections are preferably so spaced apart and/or apertured that the liquid can boil up and well over the lower section or sections when its level is not high enough to cover the entire heater assembly.

The invention will be described in greater detail with reference to the accompanying drawing in which.

Figure 1:
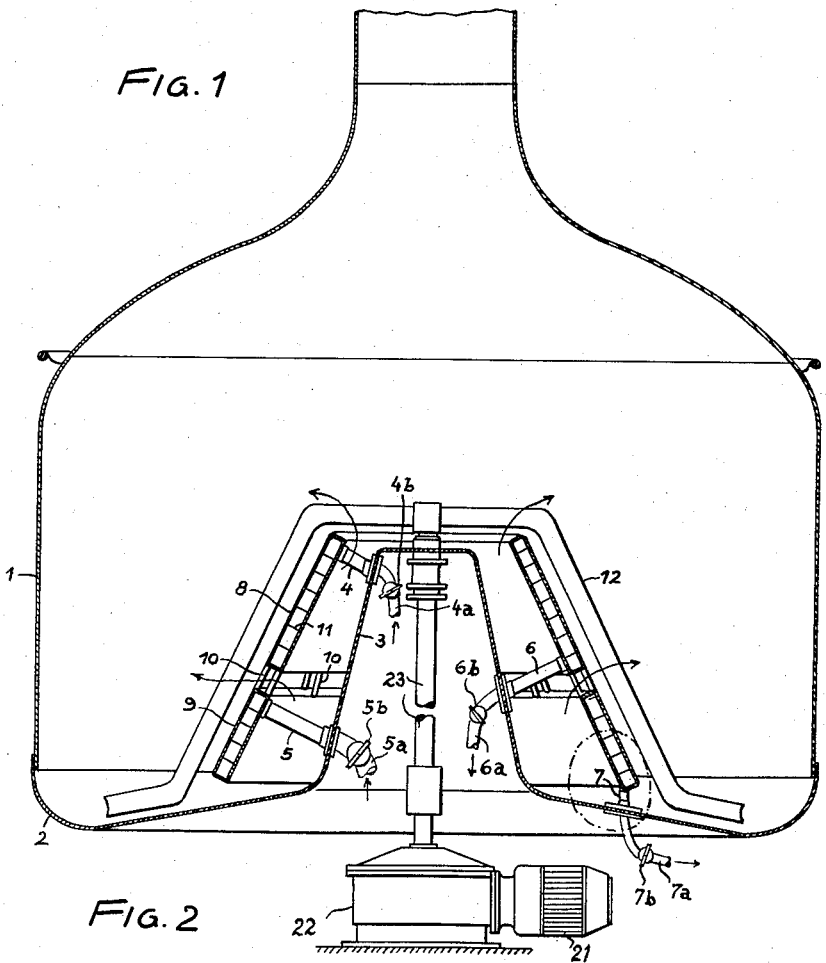
Fig. 1 is a sectional elevational view of a cooking vessel according to the invention.

The vessel shown in Fig. 1 comprises a tubular flask 1 fitting snugly inside a shallow bottom pan 2 and serves as a support for a heater assembly comprising a main heater 8 and a preliminary heater 9. The two heaters 8 and 9 are of frustoconical configuration, coaxial with boss 3, and form continuations of each other which are axially spaced apart and interconnected by stays 10. Heating fluid (e.g. steam) enters the heater 8 from a duct 4a, containing a valve 4b, by way of a short pipe 4 extending between boss 3 and heater 8; this fluid is discharged via a pipe 6 and a duct 6a containing a valve 6b. In similar manner, heating fluid enters the heater 9 from a duct 5a via a valve 5b and a pipe 5, leaving it via a pipe 7 and duct 7a with valve 7b. In this manner it is possible to control the flow of fluid independently through the two heater sections 8 and 9. In some installations, the stays 10 may be dispensed with inasmuch as the elements 8 and 9 are also mechanically supported by the pipes 4, 5, 6 and 7.

Figure 4:
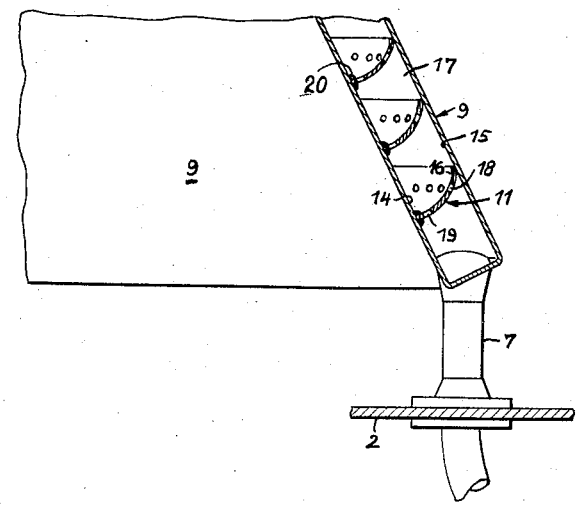
Fig. 4 is an enlarged fragmentary sectional view of the portion of the assembly of Fig. 1 encircled by dot-dash lines.

Reference is now made to Fig. 4 for a description of the preferred internal construction of the heater elements as illustrated particularly for the element 9. As there shown, this element comprises a frustoconical shell whose concentric inner and outer wall portions 14, 15 define a channel 17. A partitioning strip 11 of resilient material (e.g. copper) is wound spirohelically about an inner frustoconical wall 14 and is secured thereto, for example by brazing, as indicated at 20. Strip 11 is formed with outer apertures 18, enabling some of the steam circulating in channel 17 to be directed in jets onto the outer heater wall 15 at a location otherwise not readily accessible to the steam, and with inner apertures 19 serving for the drainage of the accumulating condensate. This construction is similar to that disclosed in my co-pending application Ser. No. 579,504.

As further illustrated in Fig. 1, there may be provided an agitator assembly comprising a plurality of stirrer bars 12 driven from a motor 21 via a speed reducer 22 and a shaft 23 rising within boss 3.

Figure 2:
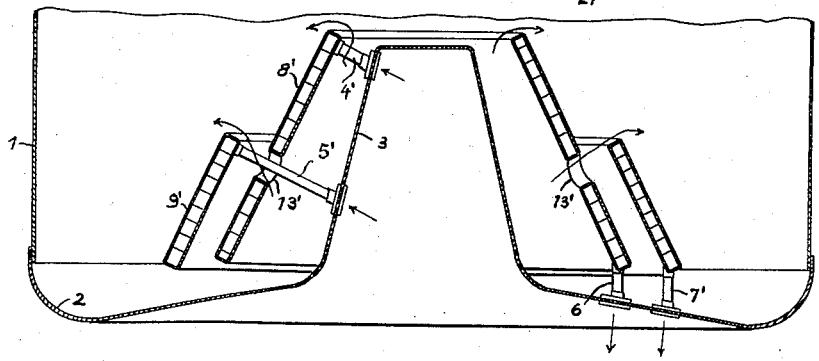
Fig. 2 is a view similar to Fig. 1, showing the lower part of the vessel with a modified heater according to the invention.

In Fig. 2 the principal heater section 8', supported by its inlet pipe 4' and outlet pipe 6', is coaxially surrounded in its lower part by the auxiliary heater section 9' having an inlet pipe 5' and an outlet pipe 7'. To facilitate the circulation of the liquid at low level, heater section 8' is provided with a series of apertures 13' near the top of heater section 9', one of these apertures serving to accommodate the pipe 5'.

Figure 3:
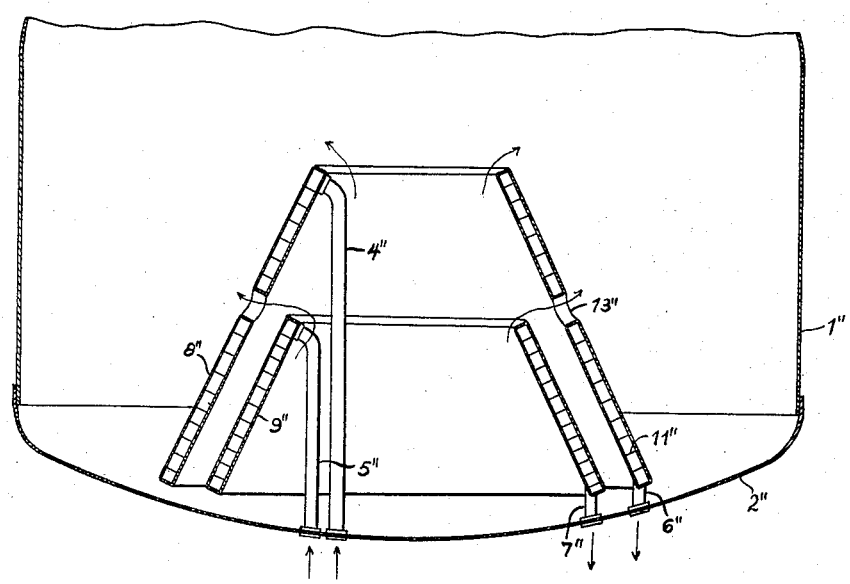
Fig. 3 is a view similar to Fig. 2, showing a further embodiment of the invention in fragmentary axial section.

In Fig. 3 I have shown a reversal of the arrangement of Fig. 2 wherein the shorter auxiliary heater section 9" is nested within the main heater section 8"; the two inlet pipes have been designated 4", 5" and the two outlet pipes are shown at 6", 7". The apertures for the circulation of liquid around auxiliary heater 9" have been shown at 13" and the partitioning strip of the heater has been shown schematically at 11".

In Fig. 3 I have further shown a modification of the vessel proper whose bottom pan 2", receiving the flask 1", is downwardly convex and lacks the re-entrant portion represented by boss 3 in Figs. 1 and 2. It will be seen that in this embodiment, too, the central channel traversed by the boiling liquid becomes progressively more constricted toward the top, thereby resulting in increasing speeds of the liquid flow.

It will be understood that the heater assembly shown in Fig. 3 might also be used with the vessel of Figs. 1 and 2, or vice versa, and that an agitator device as illustrated in Fig. 1 may be used in conjunction with the other embodiments. These and further modifications of the embodiments of the invention specifically disclosed herein will be readily apparent to persons skilled in the art and are intended to be encompassed in the scope of the invention as defined in the appended claims.

I claim:

1. A cooking utensil for foaming liquids, comprising a vessel provided with a frustoconical formation rising centrally from its bottom and narrowing at the top, a frustoconical heater plate coaxially surrounding said formation and defining therewith an upwardly narrowing channel, said heater plate being divided into two independently energizable frustoconical sections separated from each other by an annular clearance communicating with said channel and forming a passage for the liquid in said vessel, and control means for selectively energizing said sections.

2. A cooking utensil for foaming liquids, comprising a vessel provided with a frustoconical formation rising centrally from its bottom and narrowing at the top, a frustoconical heater plate coaxially surrounding said formation and defining therewith an upwardly narrowing channel, said heater plate being divided into two independently energizable frustoconical sections separated from each other by an annular clearance communicating with said channel, agitator means rotatable about the axis of said formation, said agitator means including a plurality of angularly spaced depending arms extending substantially parallel to the generatrices of said heater plate across the outer surfaces of both of said sections, and control means for selectively energizing said sections.

References Cited in the file of this patent

UNITED STATES PATENTS

| | | |
|---|---|---|
| 84,995 | Clifford | Dec. 15, 1868 |
| 1,772,145 | Harter et al. | Aug. 5, 1930 |
| 1,874,996 | Heller | Aug. 30, 1932 |
| 1,922,220 | Sprague | Aug. 15, 1933 |
| 1,938,441 | Ruesch | Dec. 5, 1933 |
| 2,022,333 | Woolley | Nov. 26, 1935 |
| 2,275,705 | Wagner | Mar. 10, 1942 |
| 2,536,752 | Kingston | Jan. 2, 1951 |

FOREIGN PATENTS

| | | |
|---|---|---|
| 677,579 | Great Britain | Aug. 20, 1952 |
| 926,065 | Germany | Apr. 4, 1955 |

OTHER REFERENCES

Schlimme: abstract of application Ser. No. 772,962, pub. March 18, 1952, 656 O.G. 88.